United States Patent Office 3,304,984
Patented Feb. 21, 1967

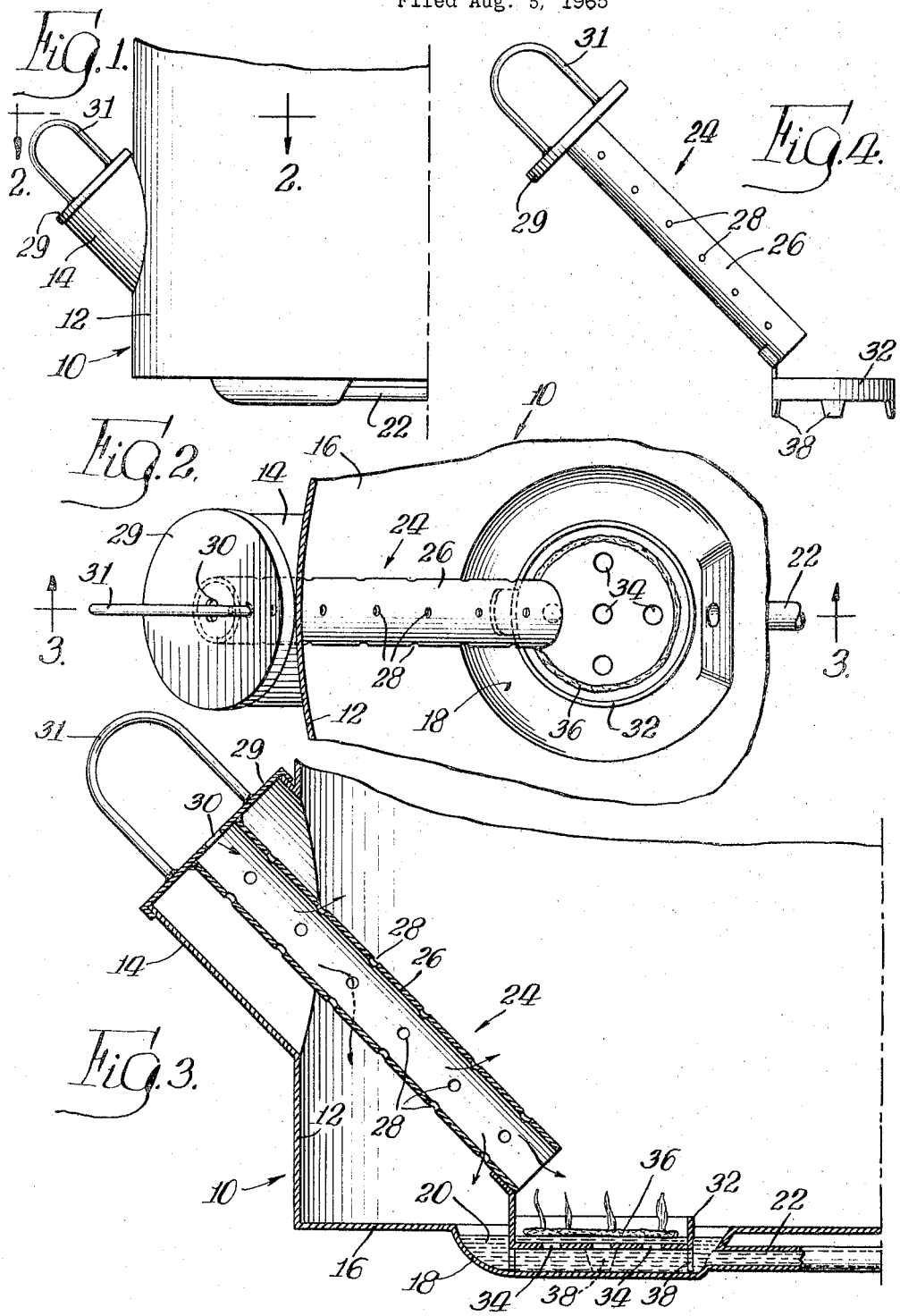

3,304,984
LIGHTER-PILOT ASSEMBLY
Dieter H. Hellmann, Pierrefonds, Quebec, Canada, assignor to Vapor Corporation, Chicago, Ill., a corporation of Delaware
Filed Aug. 5, 1965, Ser. No. 477,467
6 Claims. (Cl. 158—91)

My present invention relates to a lighter-pilot assembly especially adapted for use in a pot burner such as a kerosene burning heater.

In a pot burner of the type described a pilot is usually required. Such pilot must be frequently inspected to insure proper wicking and pilot operation. Also, a lighter is required to light the pilot. Heretofore, the necessary lighter has been entirely separate from the pot burner and the pilot itself.

It is an object of my present invention to provide a pilot and a lighter which are adapted for use in a pot burner and which are combined in a single assembly.

It is another object of my present invention to provide a lighter-pilot assembly, as described, which is removably mounted within the pot burner.

It is a feature of my present invention that the pilot is exposed for inspection, and rewicking if necessary, every time the lighter-pilot assembly is removed for the purpose of igniting the pilot.

It is another feature of my present invention that the lighter-pilot assembly must be mounted in the pot burner for proper operation thereof and thus no elements can become misplaced or lost as would otherwise be the case if the lighter were separate from the pilot.

It is a further object of my present invention to provide a lighter-pilot assembly, as described, wherein ashes and residue of burned wicking do not remain in the pot burner but are removed therefrom with the lighter-pilot assembly thereby permitting the pot burner to remain clean.

It is a still further object of my present invention to provide a lighter-pilot assembly, as described, wherein burning of the pilot within the pot burner may be readily observed from a point exteriorly of the pot burner.

Now in order to acquaint those skilled in the art with the manner of constructing and using lighter-pilot assemblies in accordance with the principles of my present invention, I shall describe in connection with the accompanying drawing a preferred embodiment of my invention.

In the drawing:

FIGURE 1 is a partial side elevational view of a pot burner incorporating the lighter-pilot assembly of my present invention;

FIGURE 2 is a fragmentary horizontal view, on an enlarged scale, taken substantially along the line 2—2 in FIGURE 1, looking in the direction indicated by the arrows;

FIGURE 3 is a fragmentary sectional view, taken substantially along the line 3—3 in FIGURE 2, looking in the direction indicated by the arrows; and FIGURE 4 is a side elevational view of the lighter-pilot assembly of my present invention.

Referring now to the drawing, there is indicated generally by the reference numeral 10 one type of pot burner, such as a kerosene burning heater, with which the lighter-pilot assembly of my present invention may be incorporated. The pot burner 10 is comprised of a housing having an outer side wall 12 which may be round and in which is mounted an upwardly inclined sleeve 14 that defines an opening in the pot burner 10. The housing of the pot burner 10 also includes a bottom 16 which is formed with a depressed central portion 18 that serves as a pilot pan. Fuel 20, such as kerosene, is adapted to be supplied to the pilot pan 18 through a pipe or conduit 22.

The lighter-pilot assembly of my present invention, which is indicated generally by the reference numeral 24, comprises a tubular rod 26 having a plurality of longitudinally and circumferentially spaced apertures 28 in the wall thereof. The upper end of the rod 26 is suitably secured to the central portion of a cap member 29 arranged for attachment on the outer end of the sleeve 14. The cap member 29 is provided with an aperture 30 aligned with the bore of the tubular rod 26, and with a finger grip 31. Suitably secured to the lower end of the tubular rod 26 is the one side of a pilot cup 32 which is arranged to extend at an angle relative to the longitudinal axis of the tubular rod 26. The pilot cup 32, which is preferably round in plan, is provided with a plurality of apertures 34 in the bottom thereof, and serves to support wicking 36. If desired, the pilot cup 32 may be provided with circumferentially spaced foot portions 38 adapted to rest on the pilot pan 18.

When the lighter-pilot assembly 24 is disposed within the pot burner 10 and the cap member 29 is attached on the outer end of the sleeve 14, the tubular rod 26 projects angularly downwardly into the pot burner 10 and the pilot cup 32 is received within the pilot pan 18. The level of the fuel 20 within the pilot pan 18 is maintained slightly above the lower portion of the pilot cup 32, and the pilot cup apertures 34 permit fuel 20 to rise within the pilot cup 32 to soak the wicking 36.

When the pot burner 10 is to be activated, the lighter-pilot assembly 24 is withdrawn from the pot burner through the sleeve 14. At this time, the wicking may be inspected and replaced if necessary. Assuming that it is satisfactory, the soaked wicking is ignited and the lighter-pilot assembly 24 is redisposed within the pot burner 10 with the burning wicking serving as a pilot. As will be appreciated, the aperture 30 in the cap member 29, the bore of the tubular rod 26 and the apertures 28 in the wall of the tubular rod 26 serve to transmit air to the wicking 36 to accomodate pilot burning. In addition, pilot burning may be observed from a point exteriorly of the pot burner 10 through the aperture 30 in the cap member 29 and the bore of the tubular rod 26. Finally, ashes and residue of burned wicking collect in the pilot cup 32 and may be removed when the assembly 24 is withdrawn from the pot burner. This arrangement permits the pot burner to remain clean.

While I have shown and described what I believe to be a preferred embodiment of my present invention, it will be understood by those skilled in the art that various rearrangements and modifications may be made therein without departing from the spirit and scope of my invention.

I claim:

1. A lighter-pilot assembly for use in a pot burner, comprising a tubular rod having an unobstructed bore throughout the length thereof, a cap member secured to the one end of said tubular rod and having aperture means therethrough aligned with the bore of said tubular rod, and a pilot cup secured to the other end of said tubular rod for supporting pilot wicking.

2. A lighter-pilot assembly for use in a pot burner, comprising a tubular rod having an unobstructed bore throughout the length thereof, a cap member secured to the one end of said tubular rod and having aperture means therethrough aligned with the bore of said tubular rod, and a pilot cup securd at one side to the other end of said tubular rod for supporting pilot wicking and having aperture means in the bottom thereof.

3. A lighter-pilot assembly for use in a pot burner, comprising a tubular rod having aperture means in the wall thereof, a cap member secured at its central portion to the one end of said tubular rod and having aperture means therethrough aligned with the bore of said tubular rod, a pilot cup secured at one side to the other end of said tubular rod and extending at an angle relative to the longitudinal axis of said tubular rod, and said pilot cup having aperture means in the bottom thereof and serving to support pilot wicking.

4. In combination, a pot burner having a housing with an opening in the side wall thereof and with a bottom portion serving as a pilot pan adapted to receive fuel; a lighter-pilot assembly comprising a tubular rod having an unobstructed bore throughout the length thereof, a cap member secured to the one end of said tubular rod and having aperture means aligned with the bore of said tubular rod, a pilot cup secured at one side to the other end of said tubular rod and having aperture means in the bottom thereof, and wicking supported in said pilot cup; and said cap member being removably attached to said housing adjacent said side wall opening with said lighter-pilot assembly extending into said burner and said pilot cup being received within said pilot pan.

5. The combination of claim 4 wherein said tubular rod is provided with aperture means in the wall thereof.

6. The combination of claim 5 wherein said housing has a depressed central bottom portion that defines said pilot pan, and said pilot cup is supported on said pilot pan.

References Cited by the Examiner

UNITED STATES PATENTS

| | | | |
|---|---|---|---|
| 1,150,177 | 8/1915 | Crilly et al. | 158—10 |
| 1,165,326 | 12/1915 | Dunn | 158—91 |
| 2,756,811 | 7/1956 | Little | 158—91 |
| 2,966,942 | 1/1961 | Breese et al. | 158—91 |

FOREIGN PATENTS

| | | |
|---|---|---|
| 1,094,394 | 12/1960 | Germany. |
| 602,930 | 6/1948 | Great Britain. |

FREDERICK KETTERER, *Primary Examiner.*